Figure 1:
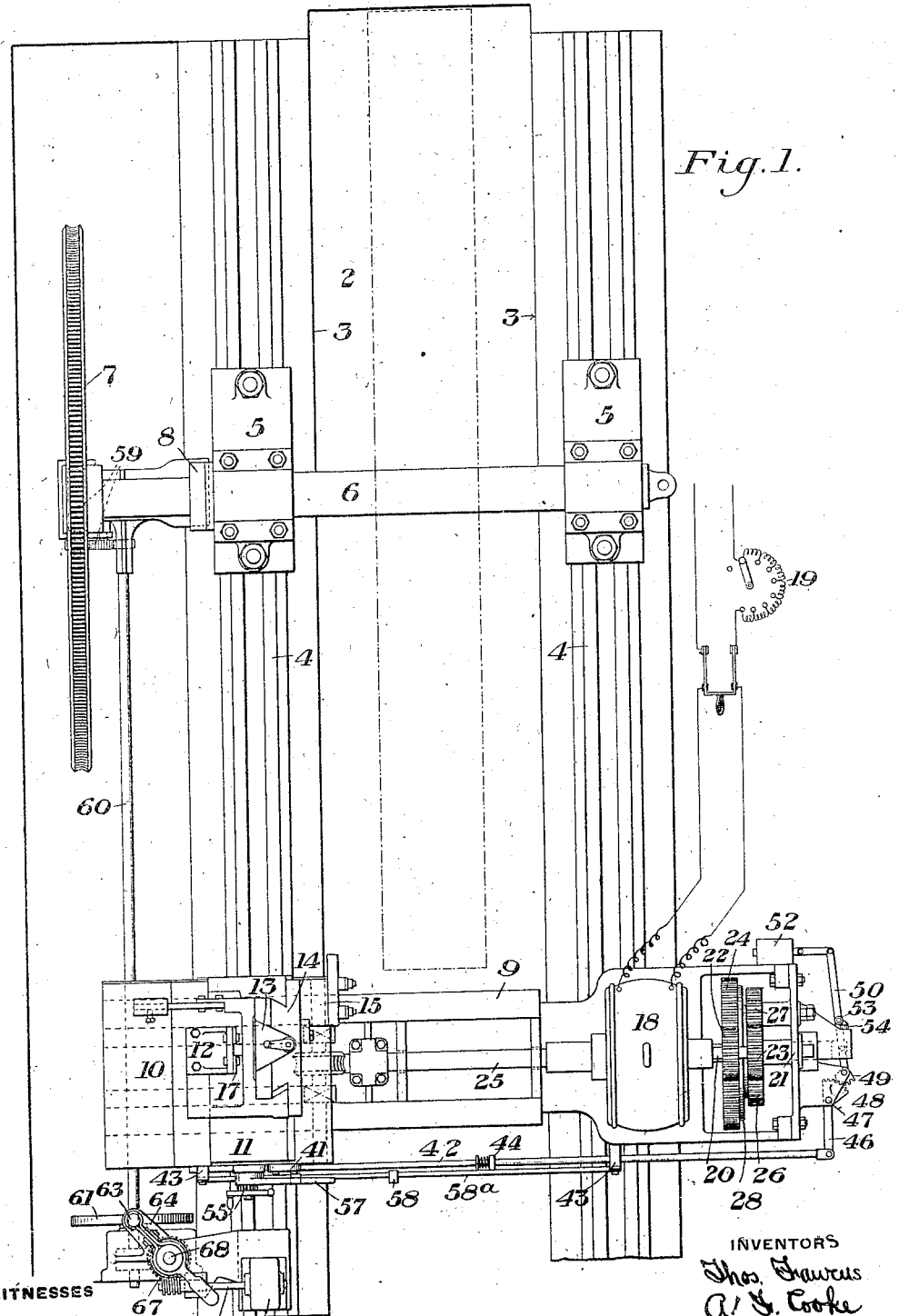

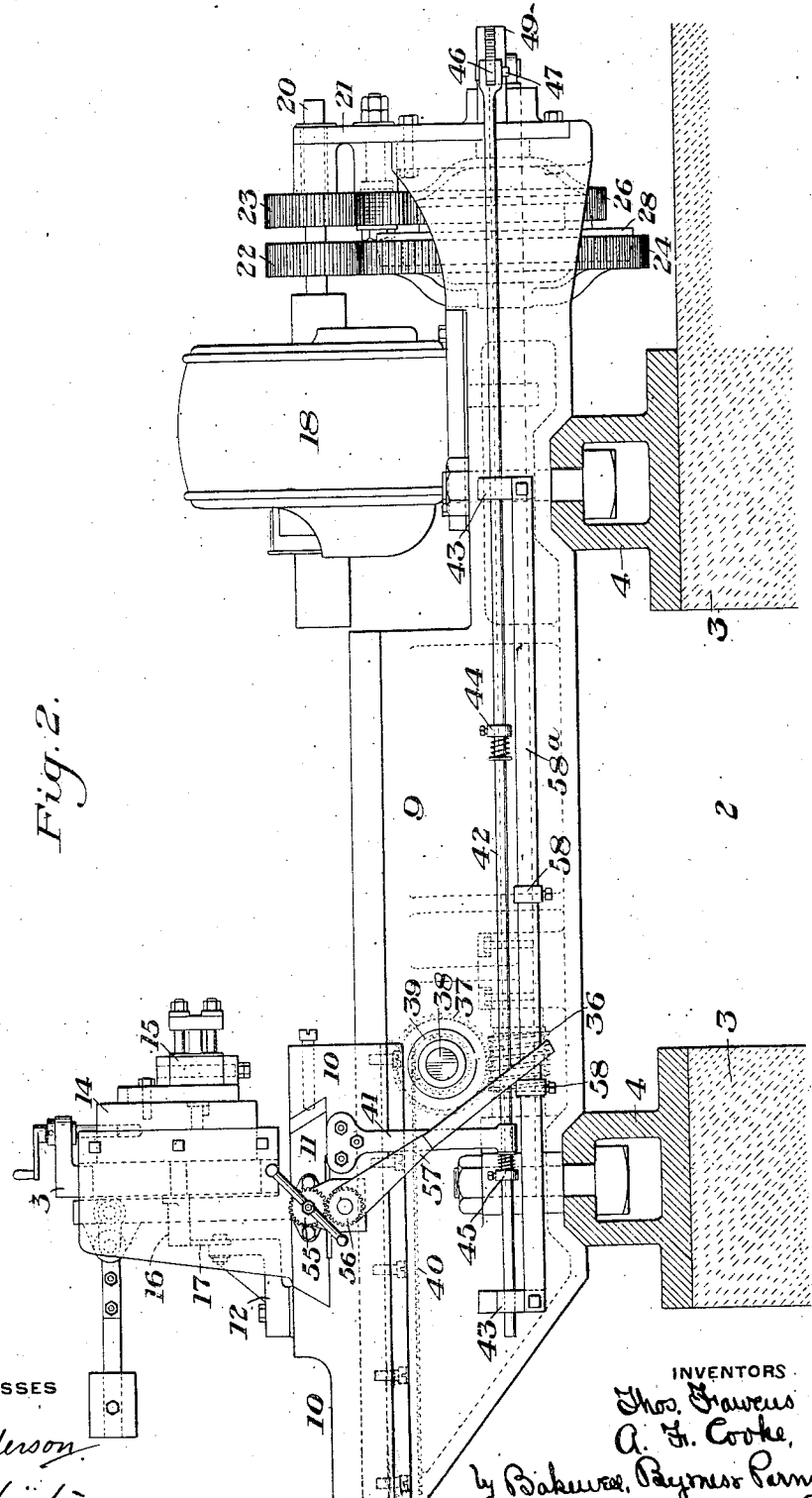

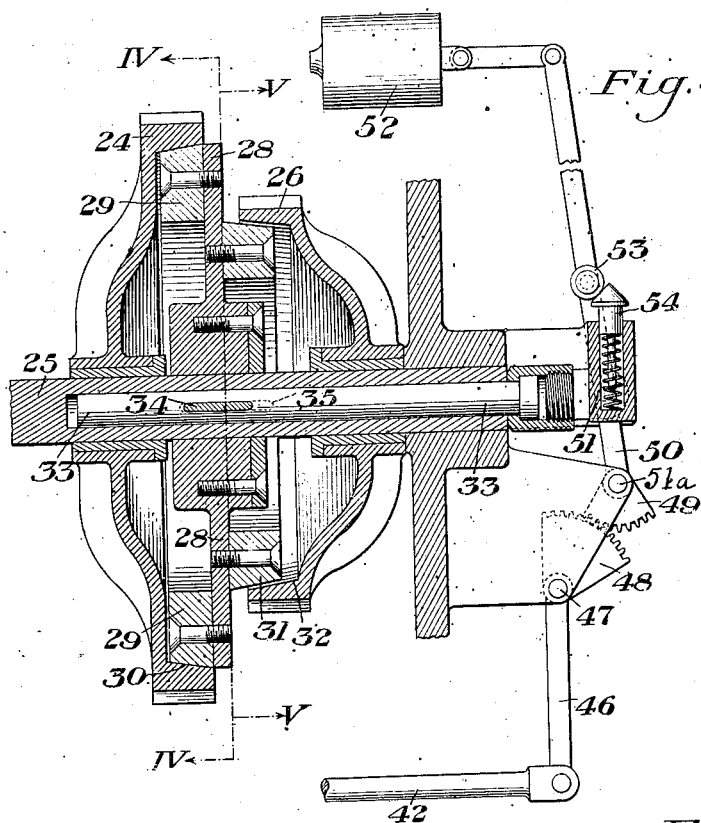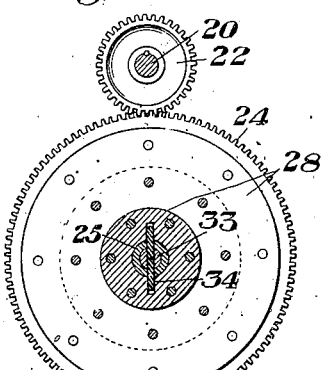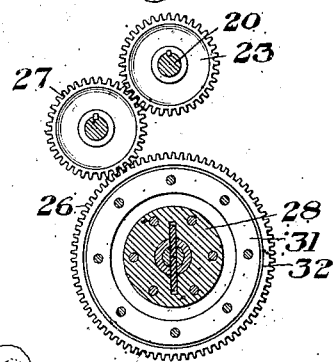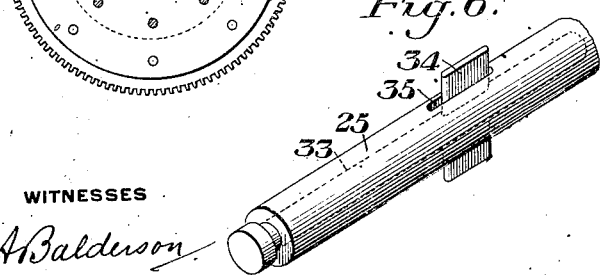

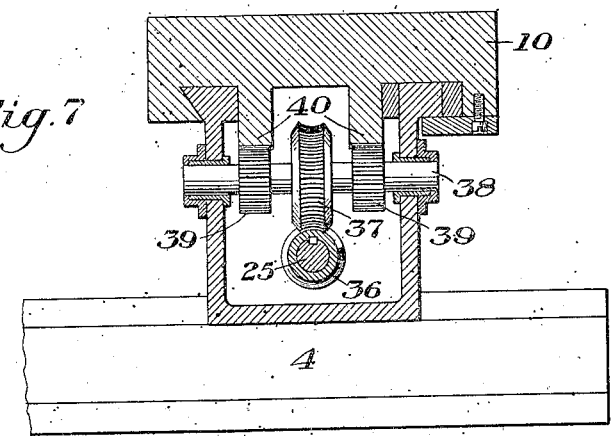
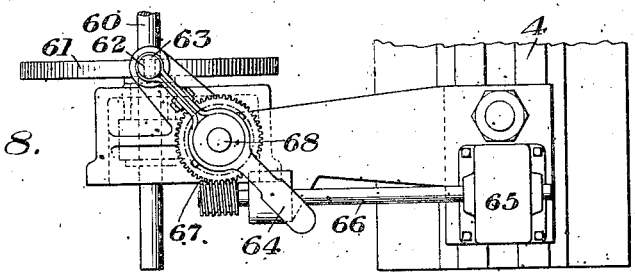
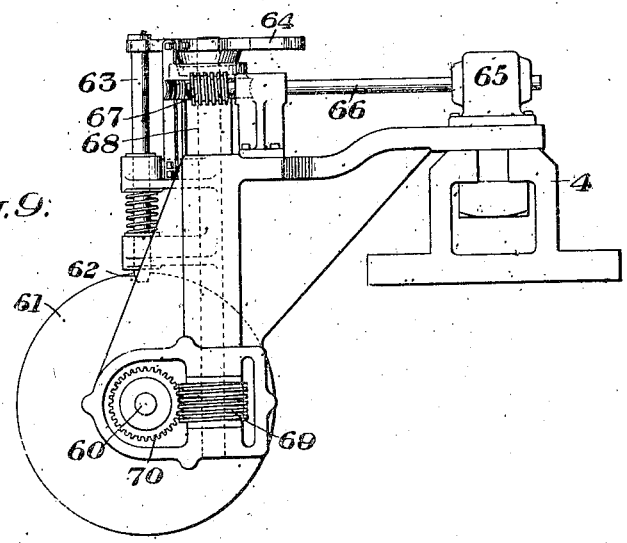

UNITED STATES PATENT OFFICE.

THOMAS FAWCUS, OF PITTSBURG, AND ALFRED F. COOKE, OF EDGEWOOD PARK, PENNSYLVANIA.

GEAR-CUTTING MACHINE.

980,232.

Specification of Letters Patent. Patented Jan. 3, 1911.

Application filed May 28, 1909. Serial No. 499,009.

*To all whom it may concern:*

Be it known that we, THOMAS FAWCUS, of Pittsburg, and ALFRED F. COOKE, of Edgewood Park, both in the county of Allegheny and State of Pennsylvania, have invented a new and useful Gear-Cutting Machine, of which the following is a full, clear, and exact description, reference being had to the accompanying drawings, forming part of this specification, in which—

Figure 1 is a plan view of a gear-cutting machine embodying our invention; Fig. 2 is an end elevation of the same; Fig. 3 is a detail sectional view of the clutch mechanism; Figs. 4 and 5 are detail views of the driving gear; Fig. 6 is a detail perspective view of one of the clutch-shifting members; Fig. 7 is a detail sectional view showing the gearing for actuating the tool saddle; and Figs. 8 and 9 are detail views showing the mechanism for operating the index wheel.

Our invention has relation to gear-cutting machines and has been more especially designed to provide a machine for cutting spur teeth on gear wheels of relatively large diameters, wide faces and coarse pitches, although the machine may also be used for cutting teeth on gear wheels of smaller diameters.

Our invention provides a machine by means of which gear wheels of large diameters, and which have heretofore presented many difficulties in properly cutting, may be conveniently and accurately cut.

The precise nature of our invention will be best understood by reference to the accompanying drawings, in which we have shown the preferred form of our invention, and which will now be described, it being premised, however, that various changes may be made in the details of construction and arrangement of the parts by those skilled in the art, without departing from the spirit and scope of our invention as defined in the appended claims.

In these drawings, the numeral 2 designates a wheel pit, preferably having concrete walls 3, and over which the machine is placed. Extending along the longitudinal upper edges of the pit are two rails or ways 4, upon which the machine is mounted.

5 designates pillow blocks which are adjustably secured to the rails or ways 4, and in which are mounted the work and indexing wheel shaft 6.

7 is the indexing wheel, which is mounted upon one end of the shaft 6, said shaft having a separable joint at 8 to facilitate placing the gear blanks thereon and removing the cut gears therefrom.

9 designates the cross rail or main slide which is adjustably mounted upon ways or rails 4 and which carries a driving mechanism and the cutting tool and feeding mechanisms.

10 designates the tool saddle, which is mounted on the cross rail or main slide 9. This saddle carries a main horizontal slide 11, which has its motion in a direction parallel to the length of the ways or rails 4, and also a fixed bracket 12, which forms the support for the gear former or pattern. The horizontal slide 11 carries the two vertical slides 13 and 14, the front slide 14 carrying the tool block 15. The rear slide 13 carries the former rider pin 16, which engages the former or templet 17, supported by the bracket 12. The slide 14 has a vertical adjustment on the slide 13, but has no direct connection with the rider pin. It can, however, be rigidly locked to the slide 13, the purpose of the separate slide 14 being to facilitate the setting of the tool for the various cuts. After the setting has once been made, the two slides are bolted together rigidly and move in unison. This cutting mechanism is, however, of well known character and forms no part of our present invention.

On one portion of the cross rail or main slide 9, is mounted an electric motor 18, which is preferably of the continuous current variable speed type, having a controlling rheostat 19, as indicated diagrammatically in Fig. 1. This motor furnishes all the power required by the machine, with the exception of a small amount used in indexing, which is preferably furnished by a smaller auxiliary motor, as hereinafter described. The motor 18 has an extended armature shaft 20, provided with an outboard bearing 21, and carries two spur pinions 22 and 23 of the same diameters. The inner pinion 22 meshes with a spur gear wheel 24, which is loosely mounted upon the main driving shaft 25. The other pinion 23 meshes with a smaller gear wheel 26, also loosely mounted on the shaft 25, through an intermediate idler pinion 27. The pinion 22 and gear wheel 24 are for the drive or cutting stroke of the tool, while the pinions 23 and 27 and the gear wheel 26 are for the speeded reverse, the speed ratio in the machine shown being approximately 2 to 3. Slidably mounted on the shaft 25, between the two gears 24 and 26, is a clutch disk 28, having on one face a friction ring 29, adapted to engage the frictional inner surface 30 of the gear wheel 24, and having on its other face a similar but smaller diameter friction ring 31, which is arranged to engage the inner frictional face 32 of the spur gear wheel 26. This clutch member is shifted alternately into and out of driving engagement with the respective wheels 24 and 26 by means of an endwise movable rod 33, which is slidably mounted in the hollow end of the shaft 25, and has a key 34 which extends through a slot 35 in the shaft 25 into engagement with the hub of the clutch member. The shaft 25 is extended backward under the tool saddle and carries a worm 36 which engages a worm wheel 37 on a cross shaft 38 (see Fig. 7). This cross shaft has two spur gears 39, which mesh with straight racks 40, on the under side of the saddle, these racks being spaced near the edges of the saddle in order to do away with any tendency to cramp or twist when the saddle is in motion. Secured to the front of the saddle is a depending arm 41, which projects downwardly and fits over a longshipping rod 42, which is supported in brackets or lugs 43 on the cross rail 9, and which is provided with adjustable springcushioned stops 44 and 45. Connected to one end of the shipping rod 42 is a lever 46, fulcrumed at 47 and having its shorter arm in the form of a toothed segment 48, whose teeth mesh with the teeth of a similar segment 49, on a lever 50, which is fulcrumed at 51ᵃ and connected at 51 to the head of the clutch-shifting rod 33, before described. As the tool saddle moves forward and backward, the depending arm 41 operates the shipping rod through the stops 44 and 45, and this rod, in turn, operates the clutch-shifting rod 33 through the toothed segments and levers, just described. The lever 50 is provided at its upper end with a dashpot attachment 52, to prevent shocks in reversing. Said lever also carries an anti-friction roller 53, which is arranged to bear against the cone-shaped head of a spring-seated pin 54, which is mounted in the end of the cross rail, as shown in Fig. 3. As the lever 50 is moved past its center, the roller 53 moves over the cone point of the pin 54, and the spring of said pin immediately throws it up at the opposite side of the roller, thereby giving a quick reverse movement.

The power feed for the cutting tool is obtained by the gears 55 and 56 (see Fig. 2) the gear 56 having an arm 57 which swings between two adjustably fixed collars 58, secured to a bar 58ᵃ on the cross rail or slide 9. This feed is of a well known character and forms no part of the present invention. It is therefore not described or shown in detail.

The index wheel 7 has a worm gear on its periphery and is operated by means of a worm 59, geared to a shaft 60. This shaft 60 extends to the front of the machine and is provided at its front end with an indexing plate 61, having a single peripheral notch 62, which is engaged by a stop pin 63, operated by a lever 64. For the purpose of operating the index wheel, I have shown a small electric motor 65 (see Figs. 8 and 9) whose shaft 66 is connected through worm gear 67 with a vertical shaft 68, having a worm 69 engaging a worm wheel 70 on the index wheel-operating shaft 60. In operation, the depression of the lever 64 releases the pin 62 from its engagement with the notch of the index plate 60, and the motor 65 is then operated to give the plate 61 and the shaft 60 the desired number of revolutions.

It will be understood that the action of the slide which carries the cutting wheel is essentially the same as the action of a shaper ram. A single pointed cutting tool is used and generates the profiles of the teeth from the former or templet, being in this respect similar to well known gear-planing machines.

The cross rail or machine slide 9 can be moved on the ways or rails 4, to any desired distance from the work-carrying and indexing shaft 6, to accommodate gear blanks of different diameters, and it will also be obvious that, if desired, other separate pillow blocks can be mounted upon the ways or rails intermediate the pillow blocks 5, and the cross rail 9, when it is desired to cut gear wheels of relatively small diameters. It will also be understood that the pillow blocks may be of any desired form. Thus, in case of gear wheels which are formed integrally with their shafts or journals, and can not therefore be mounted upon the shaft 6, special pillow blocks or supports may be provided therefor.

The machine above described is simple in its construction and arrangement of parts and is practically unlimited in the size of gear wheels which can be cut thereon.

It will be obvious that various changes can be made in the details of construction and arrangement of the parts. Thus, the tool saddle and tool slides, together with the actuating gear therefor, may be of any well known character, various forms of clutches and clutch-shifting devices may be employed for controlling the actuating gearing, and numerous other changes may be made.

We claim:

1. In a gear cutting machine, a wheel pit, ways or rails mounted at opposite sides of the pit, a work-supporting and indexing shaft supported on the ways or rails, a tool-support also mounted on said ways or rails, means for moving the tool-support and the index shaft relatively to each other to vary the distance between them, a motor, an actuating shaft geared to said motor, a reciprocating tool carrier connected to said shaft, and mechanism for feeding the tool; substantially as described.

2. In a gear-cutting machine, a wheel pit, ways or rails mounted at the upper edges of the pit at opposite sides thereof, a work-supporting and indexing shaft supported on the ways or rails, a cross rail or slide also supported on said rails, a tool carrier mounted on said slide, a constantly driven motor also mounted on the slide, and reversing gearing connecting the motor with the tool carrier, said reversing gearing being mounted on the slide and reversed by the movements of the tool carrier; substantially as described.

3. In a gear-cutting machine, a movable cross rail or slide, a tool carrier mounted for reciprocation thereon, a motor also mounted on said slide, and constantly driven in one direction, an actuating shaft geared to the tool carrier, two sets of reverse gears for connecting said shaft with the motor shaft, and means controlled by the movement of the tool carrier for alternately throwing the gears into and out of operation; substantially as described.

4. In a gear-cutting machine, a movable cross rail or slide, a tool carrier mounted for reciprocation thereon, a motor also mounted on said slide and constantly driven in one direction, said motor having its shaft provided with two driving pinions, an actuating shaft geared to the tool carrier and journaled on said slide, two gears of different diameters loosely mounted on said shaft, one of said gears having a direct engagement with one of the pinions on the motor shaft, and the other of said gears having an indirect engagement with the other pinion on the motor shaft, clutch mechanism for alternately connecting the two gears of the actuating shaft, and clutch-shifting mechanism controlled by the movement of the tool carrier, substantially as described.

5. In a gear cutting machine, a wheel pit, ways or rails mounted at the upper edges of the pit at opposite sides thereof, a work-supporting and indexing shaft supported on the ways or rails, indexing mechanism connected to said shaft, a tool-support also supported on said ways or rails, means for moving the said shaft and the tool-support relatively to each other to vary the distance between them, a tool carrier mounted on the support, a driving motor, an actuating shaft geared to said motor and also to the tool carrier, and reversing mechanism controlled by the movement of the tool-carrier; substantially as described.

6. In a gear-cutting machine, an actuating shaft for the tool carrier, a pair of gear wheels of different diameters loosely mounted on said shaft, a clutch member adapted to connect either one of the gear wheels with the shaft, a clutch-shifting rod mounted for endwise movement on the shaft, a shipping rod actuated by the movement of the tool carrier, actuating connections between the shipping rod and the clutch-shifting rod, and mechanism for feeding the tool, substantially as described.

7. In a gear-cutting machine, a wheel pit, ways or rails mounted upon opposite sides of the wheel pit, a work-supporting and indexing shaft journaled on said ways or rails, a cross rail or slide adjustably mounted on the ways or rails, and movable toward and away from said shaft, a tool-carrier mounted on said slide, a driving motor, and actuating gearing for said carrier also mounted on the slide; substantially as described.

In testimony whereof, we have hereunto set our hands.

THOS. FAWCUS.
A. F. COOKE.

Witnesses:
R. A. BALDERSON,
H. M. CORWIN.